Inventor:
Meyer Emanuel,
by Albert Spear,
Attorney

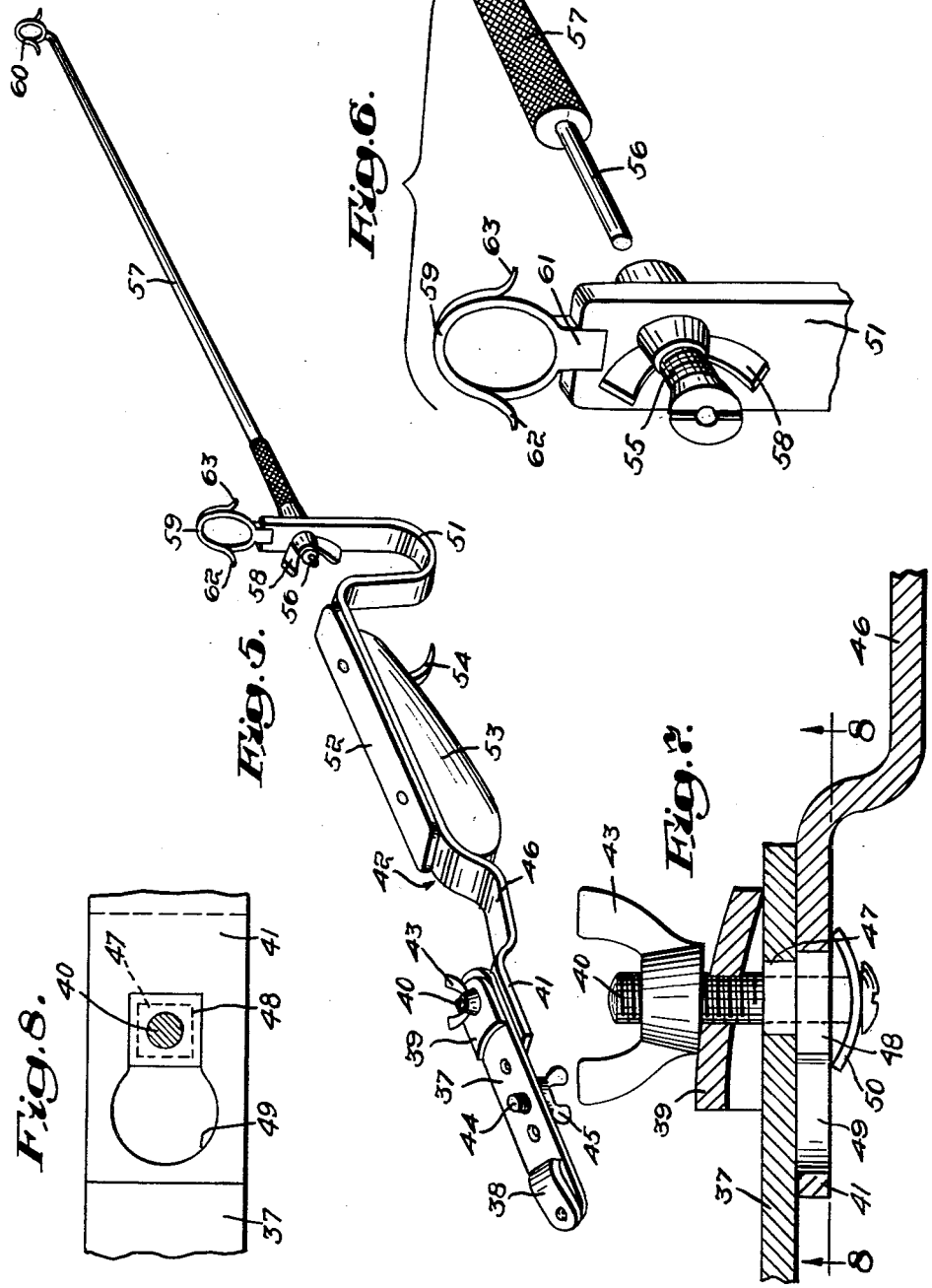

United States Patent Office 3,010,242
Patented Nov. 28, 1961

3,010,242
FISHING TACKLE
Meyer Emanuel, 100 School St., Gardiner, Maine
Filed Nov. 7, 1957, Ser. No. 695,039
9 Claims. (Cl. 43—21.2)

This invention relates to fishing tackle and particularly to combinations of wristlets and reels or seats therefor, and is continuation-in-part of my copending application, Serial No. 437,448, filed June 17, 1954, and now abandoned.

Hand line fishing is a widely practiced and effective form of angling in spite of certain objectionable features such as the lack of positive control of the line, both during and after its retrieve, and the lack of sporting qualities that rod and reel fishing can provide. The general objective of this invention is to provide fishing tackle that combines, in a novel manner, certain desirable features of both types of fishing.

In accordance with the invention, this objective is attained by tackle in which a reel or rod, a reel seat, or a rod seat, and a wristlet are combined to ensure adequate control of the line at all times while permitting the fisherman to have full use of both hands for other purposes, rowing, for example. As the tackle is attached to a wrist, the fisherman can exercise full control over it much more quickly than he can when the rod is carried by a rod holder attached to the boat.

In the drawings there is shown an illustrative embodiment of the invention from which these and other of its objectives, novel features, and advantages will be readily apparent.

In the drawings:

FIG. 5 is a perspective view of fishing tackle in accordance with the invention illustrating further features thereof;

FIG. 6 is a fragmentary view, on an increased scale, showing the junction of the rod member and the rod extension in the embodiment shown in FIG. 5;

FIG. 7 is a fragmentary and partly sectioned view of the invention between the reel seat and rod member; and FIG. 8 is a fragmentary bottom view of the parts shown in FIG. 7 taken along the generally indicated lines 8—8 of FIG. 7.

Figure 1:
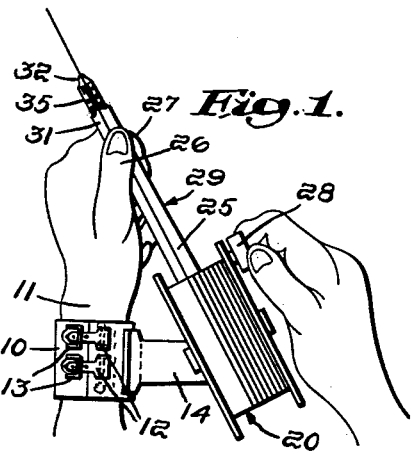
FIG. 1 is an elevational view of a fishing tackle, in accordance with the invention, illustrating its use.

At 10, there is indicated a wristlet adapted to be secured about a fisherman's wrist 11 as by means of straps 12 adjustably caught by buckles 13. Anchored to the wristlet 10 is a bracket 14 through whose free end extends the depending pivot 15 of the reel seat 16. A wing nut 17 threaded on the pivot 15 enables the reel seat 16 to be locked in any selected angular position relative to the bracket 14.

The reel seat 16 is shown as having a fixed flange 18 for the rear tongue 19 of the generally indicated reel 20. The front tongue 21 of the reel 20 is clamped against the reel seat 16 by the flange 22 through which and the reel seat extends a bolt 23 having a wing nut 24 threaded on its free end.

In practice, the wristlet 10 is usually attached to the left wrist 11 of the fisherman, assuming that he is right-handed, with the bracket 14 extending from the inside thereof. The line 25 is usually cast with the right hand, in handline fishing, but at other times is held between the thumb 26 and the forefinger 27 of the left hand. When thus held, it is desirable that the line 25 define an acute angle with respect to the axis of the wrist 11, usually substantially 30°. This arrangement is easily established by appropriately setting the angle of the reel seat 16 to the bracket 14 and it will be noted that when the reel 20 is thus positioned, its crank 28 is favorably located for convenience in reel operation.

In practice, the reel carrying arm of the fisherman is used to set the hook and to pull in a hooked fish with the reel 20 being operated to take up the slack as it is thus developed. In the case of heavy fish, there is the danger that the fingers will suffer friction burns and it is for that reason that a reel seat extension, generally indicated at 29, is provided.

The extension 29 is a rod element of resilient stock and has a part 30, pivotally attached to the reel seat 16 as by the bolt 23, and a part 31 adapted to be swung from a position of storage against the under surface of the reel seat 16 into a position of use. It will be noted that the bracket 14 is disposed at right angles to the palmar face of the wrist, preferably adjacent the ulnar side thereof.

It is necessary, accordingly, for the part 31 of the rod element 29 to have that angular relationship relative to the rod element part 30 that will bring the rod element and its grooved guide extremity 32 into a position to lay over the index finger 27. While the resilience of the stock from which the rod element 29 is formed enables the part 31 to be swung under the reel seat 16, it is shown as formed with a U-shaped bend 33 to enable it to clear the wing nut 17 and, in addition, it is provided with a U-shaped bend 34 to provide a greater degree of resilience adjacent the grooved guide 32.

In order that the advantages of rod and reel fishing may be more clearly approximated, the extension part 31 is shown as having its margins turned upwardly and inwardly towards each other as indicated at 35, thus to provide a resilient socket frictionally receiving the butt of the rod element 36.

Figure 2:
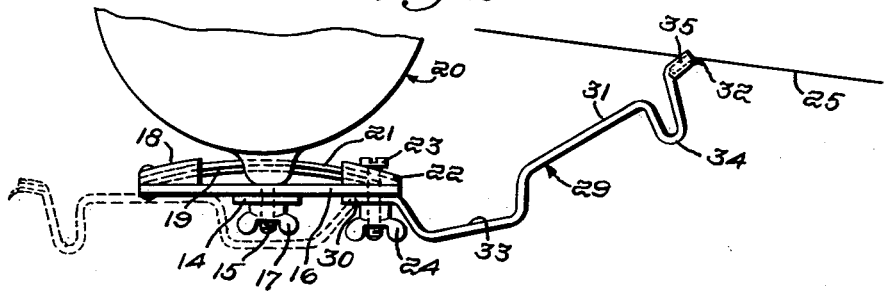
FIG. 2 is a fragmentary view of the tackle, on a somewhat increased scale, as seen from the crank end of the reel.
Figure 3:
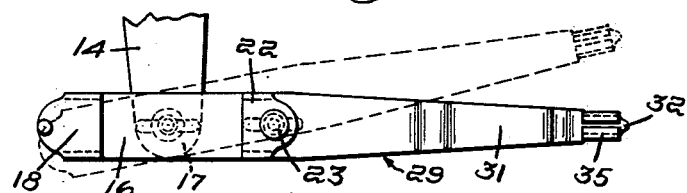
FIG. 3 is a fragmentary, plan view showing the bracket and reel seat and the flexible extension which are pivotally connected thereto.
Figure 4:
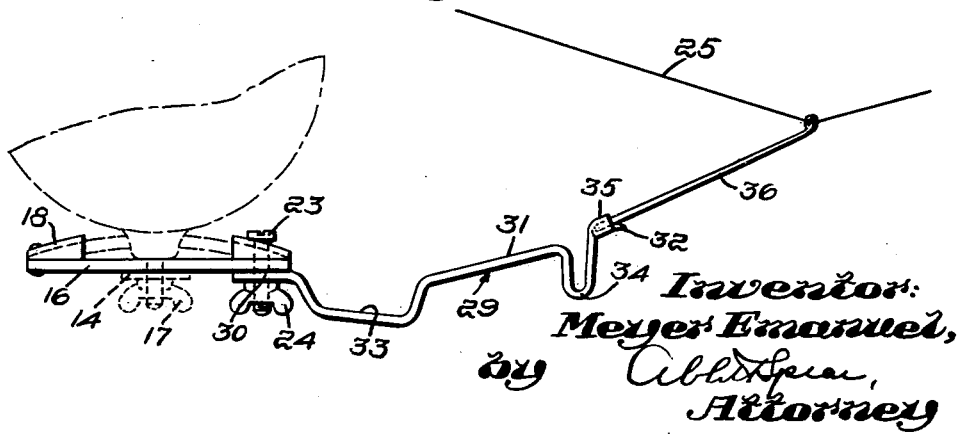
FIG. 4 is a view, generally similar to FIG. 2, but with the extension operatively positioned and a rod tip carried thereby.

In the embodiment of the invention shown in FIGS. 5–7, the reel seat 37 has a fixed flange 38 for the rear tongue 19 of a reel, such as the reel 20 shown in FIGS. 1, 2 and 4 and a front flange 39 for the front tongue 21 thereof through which and the reel seat 37 extends the pivot 40 connecting the rear end 41 of a rod member 42 thereto and threaded to receive the wing nut 43.

The reel seat 37 has a centrally located, depending pivot 44 to which the bracket 14 of the wristlet 10 is locked by a wing nut 45. As in the embodiment of the invention shown in FIGS. 1–4, the rod member 42 has a first U-shaped part 46 shaped and dimensioned to clear the pivot 44 and its wing nut 45 when the rod member 42 is swung rearwardly from its full line position of use shown in FIG. 5. In practice, it is preferred that the front part of the reel seat 37 have a nut 47 through which the pivot 40 is threaded and an integral block portion 48 dimensioned to rotatably enter the larger end of a keyhole slot 49 in the rear end 41 of the rod member and to be slidably confined within the narrower part thereof. The pivot 40 also extends through a spring washer 50.

When the rod member 42 is to be swung rearwardly from its position of use, it is first pushed rearwardly to free the portion 48 so that it may be turned in the larger part of the keyhole slot 49. After it has been swung rearwardly under the reel seat, the portion 48 is advanced forwardly to again enter the smaller part of the keyhole slot.

The free end of the rod member terminates in a second U-shaped portion 51 and between the two U-shaped portions there is a platform 52 and grip portion 53 provided with a trigger grip 54. The front wall of the portion 51 carries a split, threaded chuck element 55 adapted to receive the shank 56 of a rod extension 57 and to be brought into a secure clamping engagement as by the wing nut 58 when rotated in a counter-clockwise direction. Said front wall of the portion 51 carries a guide 59 while at the tip of the rod extension 57 there is a tip guide 60. It is preferred that both guides 59 and 60 consist of a loop centrally secured as at 61 with free ends 63 and 62 disposed laterally in opposite directions to enable line to be caught thereunder and entered through the guide thus to avoid threading it therethrough.

What I therefore claim and desire to secure by Letters Patent is:

1. Fishing tackle comprising a flat elongated reel seat member having a traverse aperture located at its middle and another adjacent one end, a fishing line reel, a bracket member having one end pivotally connected to said reel seat at said middle aperture, the other end of said bracket member terminating in a wristlet, a rod member pivotally connected to said reel seat at said aperture adjacent one end thereof and below the reel seat and including a portion adjacent the pivotal connection thereof having a substantially U-shape sufficiently wide and deep so that said rod is adapted to underlie the reel seat with said U-shaped portion extending below the pivotal connection for the bracket end and the reel, said rod terminating at the end opposite the pivotally connected end in a second substantially U-shaped portion terminating in a socket member adapted to receive a rod extension, said socket having a slot therethrough adapted to serve as a line guide, and a pair of flanges on opposite ends of said reel seat supporting the reel thereupon, the pivotal connecting means for the rod member also fastening one of said flanges to hold the reel on the seat.

2. Fishing tackle comprising a flat elongated reel seat member, a wristlet including a bracket member, one end of said bracket member being pivotally connected to the reel seat, a rod member pivotally connected to the under surface of one end of the reel seat and including a portion adjacent the pivotal connection thereof having a substantially U-shape sufficiently wide and deep so that said rod is adapted to underlie the reel seat with said U-shaped portion extending below the pivotal connection for the bracket end, said rod terminating at the end opposite the pivotally connected end in a second substantially U-shaped portion, the free end of said second U-shaped portion including a guide and a socket for a rod extension.

3. Fishing tackle comprising a flat elongated reel seat member, a wristlet including a bracket member, one end of said bracket member being pivotally connected to the reel seat, a rod member pivotally connected to the under surface of one end of the reel seat and including a portion adjacent the pivotal connection thereof having a substantially U-shape sufficiently wide and deep so that said rod is adapted to underlie the reel seat with said U-shaped portion extending below the pivotal connection for the bracket end, said rod terminating at the end opposite the pivotally connected end in a second substantially U-shaped portion, a rod extension including a tip guide, the free end of said second U-shaped portion including a guide and a socket for said extension.

4. The tackle of claim 3 in which the guides are a loop of wire-like stock centrally anchored with its ends laterally disposed in opposite directions.

5. Fishing tackle comprising a flat elongated reel seat member, a wristlet including a bracket member, one end of said bracket member being pivotally connected to the reel seat, a rod member pivotally connected to the under surface of one end of the reel seat and including a portion adjacent the pivotal connection thereof having a substantially U-shape sufficiently wide and deep so that said rod is adapted to underlie the reel seat with said U-shaped portion extending below the pivotal connection for the bracket end, said rod terminating at the end opposite the pivotally connected end in a second substantially U-shaped portion including in its free end a chuck-like clamping element to receive a rod extension.

6. Fishing tackle comprising a flat, elongated reel seat member, a rod member pivotally connected to the under surface of one end of the reel seat and terminating at the end opposite the pivotally connected end in a substantially U-shaped resilient portion including in its free end a chuck to receive and clamp a rod extension, and a line guide attached to said portion.

7. Fishing tackle comprising a flat, elongated reel seat member, a rod member pivotally connected to the under surface of one end of the reel seat and terminating at the end opposite the pivotally connected end in a substantially U-shaped resilient portion including in its free end a chuck to receive and clamp a rod extension, and a line guide consisting of a loop of wire-like stock centrally anchored to said portion with its ends laterally disposed in opposite directions.

8. Fishing tackle comprising a flat, elongated reel seat member, a rod extension including a tip end guide, a rod member pivotally connected to the under surface of one end of the reel seat and terminating at the end opposite the pivotally connected end in a substantially U-shaped resilient portion including in its free end a chuck to receive and clamp said rod extension, and a line guide attached to said portion.

9. Fishing tackle comprising a flat, elongated reel seat member, a rod extension including a tip end guide, a rod member pivotally connected to the under surface of one end of the reel seat and terminating at the end opposite the pivotally connected end in a substantially U-shaped resilient portion including in its free end a chuck to receive and clamp said rod extension, and a line guide attached to said portion, each of said guides consisting of a loop of wire-like stock centrally anchored to said portion with its ends laterally disposed in opposite directions.

References Cited in the file of this patent

UNITED STATES PATENTS

| | | |
|---|---|---|
| 2,593,885 | James | Apr. 22, 1952 |
| 2,662,329 | Henry | Dec. 15, 1953 |

FOREIGN PATENTS

| | | |
|---|---|---|
| 724,889 | Great Britain | 1955 |